US011467648B2

United States Patent
Ansari et al.

(10) Patent No.: US 11,467,648 B2
(45) Date of Patent: Oct. 11, 2022

(54) METHODS AND APPARATUS TO REDUCE POWER CONSUMPTION AND IMPROVE BATTERY LIFE OF DISPLAY SYSTEMS USING ADAPTIVE SYNC

(71) Applicant: Intel Corporation, Santa Clara, CA (US)

(72) Inventors: Nausheen Ansari, Folsom, CA (US); Kevin W. Krueger, El Dorado Hills, CA (US); Vishal R. Sinha, Portland, OR (US); Seh Kwa, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 16/811,663

(22) Filed: Mar. 6, 2020

(65) Prior Publication Data
US 2020/0278735 A1 Sep. 3, 2020

(51) Int. Cl.
*G06F 1/3234* (2019.01)
*G06F 8/658* (2018.01)
*G06F 1/3212* (2019.01)

(52) U.S. Cl.
CPC .......... *G06F 1/3234* (2013.01); *G06F 1/3212* (2013.01); *G06F 8/658* (2018.02)

(58) Field of Classification Search
CPC .............. G06F 1/3265; G09G 2330/02; G09G 2360/08; G05B 2219/23119
See application file for complete search history.

(56) References Cited

U.S. PATENT DOCUMENTS

| | | | | |
|---|---|---|---|---|
| 4,779,095 A * | 10/1988 | Guerreri | ............ | B60K 31/0008 180/169 |
| 2009/0193109 A1* | 7/2009 | Kuo | ...................... | G06F 1/3209 709/223 |
| 2011/0046698 A1* | 2/2011 | Kivi | ...................... | H04W 76/19 607/60 |
| 2012/0075188 A1* | 3/2012 | Kwa | ..................... | G09G 3/2096 345/168 |
| 2013/0229960 A1* | 9/2013 | Sahu | ................... | H04W 52/028 370/311 |
| 2014/0111531 A1* | 4/2014 | Kwa | ..................... | G09G 3/3611 345/545 |
| 2014/0211676 A1* | 7/2014 | Chhabra | ........... | H04W 52/0209 370/311 |
| 2016/0275900 A1* | 9/2016 | Kwa | ...................... | G09G 5/003 |
| 2018/0286345 A1* | 10/2018 | Lee | ......................... | G09G 5/006 |

* cited by examiner

*Primary Examiner* — Santosh R Poudel
(74) *Attorney, Agent, or Firm* — Hanley, Flight & Zimmerman, LLC (57) ABSTRACT

Methods, apparatus, systems and articles of manufacture to reduce power consumption and improve battery life of display systems using adaptive sync are disclosed. An example apparatus includes an interface to transmit frame data to a sink device, the frame data generated by a processor; a timer to initiate in response to the transmission of the frame data to the sink device; and the interface to transmit a low power indication to the sink device after the timer reaches a threshold amount of time.

25 Claims, 7 Drawing Sheets

METHODS AND APPARATUS TO REDUCE POWER CONSUMPTION AND IMPROVE BATTERY LIFE OF DISPLAY SYSTEMS USING ADAPTIVE SYNC

FIELD OF THE DISCLOSURE

This disclosure relates generally to video processing, and, more particularly, to methods and apparatus to reduce power consumption and improve battery life of display systems using adaptive sync.

BACKGROUND

Display systems often include a processing device (e.g., a source including a graphical processing unit) to transmit frames (e.g., images to be displayed based on pixel information) to a sink device (e.g., a panel) that includes a display. Some sink devices utilize Adaptive Sync. Adaptive Sync allows for a vertical blanking duration to be determined by the availability of data for a subsequent frame thereby providing a variable refresh rate (e.g., the number of times per second that the display redraws an image on a screen) to address tearing, studder, and/or input lag seen in sink devices.

The figures are not to scale. In general, the same reference numbers will be used throughout the drawing(s) and accompanying written description to refer to the same or like parts. As used herein, connection references (e.g., attached, coupled, connected, and joined) are to be construed in light of the specification and, when pertinent, the surrounding claim language. Construction of connection references in the present application shall be consistent with the claim language and the context of the specification which describes the purpose for which various elements are connected. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, advances in technology have led to advances in display systems. Display systems typically include a sink device (e.g., panel) including a display to output images (e.g., frames) and/or video (e.g., a series of frames) to display to a user. In operation, the sink device is connected (e.g., via a wired or wireless connection) to a source device (e.g., including a graphics processor unit (GPU)) that provides the frame data (e.g., pixel information corresponding to the images and/or video) to the sink device for display. To support a variable refresh rate, Adaptive Sync capable sink devices (e.g., display port (DP) panels and/or embedded DP (eDP) panels) are able to operate between a minimum (e.g., 24 hertz (Hz)) and a maximum (e.g., 144 Hz) refresh rate. The refresh rate is variable to synchronize a display refresh rate with the frames per second provided by the GPU to eliminate tearing, stutter, and/or input lag. The minimum and/or maximum refresh rate is set based on the capabilities of the panel (e.g., refresh rate(s), pixel clock frequency range, pixel retention capabilities, resolution capabilities, vertical blanking duration, etc.). In this manner, the display refresh rate at the source can match the render rate at the sink. Accordingly, Adaptive Sync is used in display systems to lower the bill of materials cost, lower latency, and increase performance.

When a display panel implements Adaptive Sync, the refresh rate is changed by varying a vertical blanking (vblank) period for frames between a minimum and maximum value specified by the display panel. The vblank period is the period between vertical blanking interrupts used to generate a video display. The vblank period can be variable and can end when a subsequent frame is ready for display. After the source transmits a frame to the sink over a link (e.g., a main link, an eDP link, etc.), the source waits a minimum vblank period that corresponds to the highest refresh rate that the sink device can support. At the end of the minimum vblank period, if the source determines that a subsequent frame is available to be transmitted (e.g., if the source sees a flip), the source transmits the subsequent frame to the sink device. If, after the end of the minimum vblank period, the source determines that a subsequent frame is not available, the source waits until the end of the maximum vblank period or until a subsequent frame is available. If a subsequent frame is not received at the end of the maximum vblank period (e.g., a flip does not occur), the source retransmits the previous frame to the sink (e.g., to prevent and/or reduce tearing, stutter, and/or input lag).

Examples disclosed herein facilitate a "hurry up and go" idle mode based on the Adaptive Sync protocol. Examples disclosed herein transfer frame data (e.g., pixel information corresponding to a frame to be displayed) from the source device at a high pixel clock frequency to quickly pass the display information to the sink device. Once the display information is transmitted to the sink device, the source device transmits a low power indication signal to the sink device. In this manner, the source device and/or the sink device can enter a low power mode by turning off the main link, display drivers, operating system, logic devices, etc. until (A) the source device obtains a subsequent frame to be displayed of (B) a threshold duration of time has been satisfied (e.g., to avoid tearing, stutter, and/or input lag). If the source device obtains a subsequent frame to be displayed or the threshold duration of time has been satisfied, the source device transmits a wake up indication to the sink device and the process is repeated. Examples disclosed herein further provide a protocol for handling partial frame updates (e.g., when less than a threshold number of pixels are updated from a currently displayed frame to a subsequent frame). Examples disclosed herein provide power savings and extend battery life by turning off components of the source and/or sink or operating components of the sink and/or source in low power modes. For example, source devices can save between 120-400 milliwatts (mW) of power using examples disclosed herein.

Figure 1:
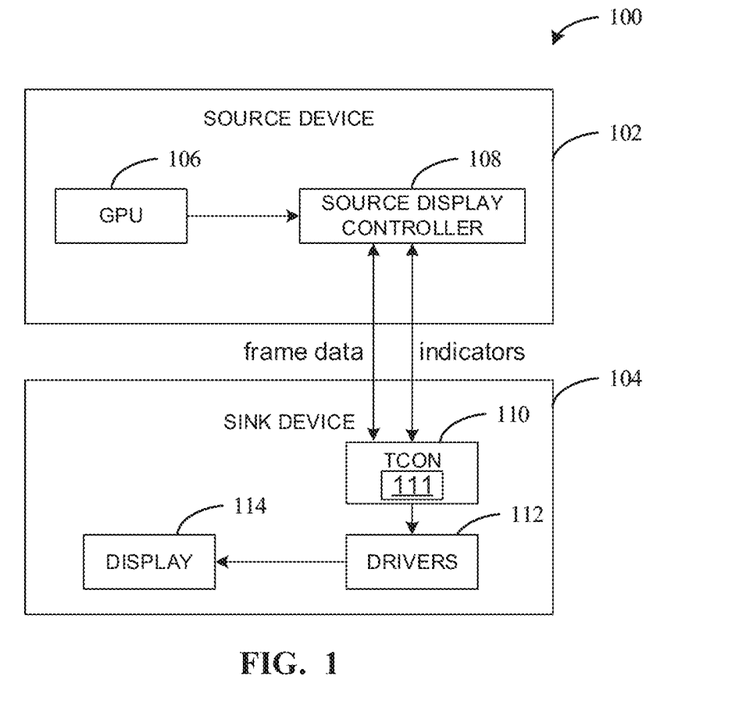
FIG. 1 illustrates an example display system to reduce power consumption and improve battery life in accordance with the examples of this disclosure.

FIG. 1 illustrates an example display system 100 that renders images and/or videos to a user. The example display system 100 includes an example source device 102 (e.g., host device) and an example sink device 104. The source device 102 may be or include a system on chip and the sink device 104 may be a display panel (e.g., DP, eDP, etc.). The example source device 102 includes a GPU 106 and a source display controller 108. The example sink device 104 includes an example timing controller (TCON) 110, example drivers 112, and an example display 114.

The example source device 102 of FIG. 1 may be a processing unit, system on chip, integrated circuit, and/or any other device that includes a GPU. For example, the source device 102 could be implemented in circuitry on a cell phone, a computer, a television, a projector, etc. The example sink device 104 can be any device that includes a display. The example sink device 104 may be implemented on a cell phone, a computer, a television, a projector, etc. The example source device 102 may be coupled to the sink device 104 via a wired connection (e.g., the circuitry of a computer coupled to the monitor) or a wireless connection (e.g., the circuitry of a cell phone wirelessly connected to a display, such as a television screen).

The GPU 106 of FIG. 1 takes in data (e.g., from a central processing unit (CPU) in communication with the GPU 106) corresponding to an image and creates frame data (e.g., data corresponding to how to operate pixels of a display to display the image). The GPU 106 performs various calculations to convert the input data into frame data. The example GPU 106 stores the generated frame data into a frame buffer. The frame buffer may be located within the GPU 106, within the example source display controller 108 (e.g., as shown below in conjunction with the frame buffer 204 of FIG. 2), and/or within the source device 102 (e.g., external to the GPU 106 and the source display controller 108).

The source display controller 108 of FIG. 1 controls the transmission of frame data to the example sink device 104. For example, the source display controller 108 can store received frame data from the example GPU 106 into a frame buffer. Once stored, the example source display controller 108 transmits the stored frame data to the example sink device 104 to render the image corresponding to the frame data. In some examples, the sink device 104 transmits the frame data at a first pixel clock frequency (e.g., 144 Hz) based on the capabilities of the sink device 104 (e.g., to transmit the frame data as quickly). The sink device 104 may transmit the capabilities (e.g., refresh rate(s), pixel clock frequency range, pixel retention capabilities, resolution capabilities, vertical blanking duration, etc.) when first connected to the source device 102 and/or at any other time.

After the source display controller 108 transmits the stored frame data, the source display controller 108 transmits a low power indication and/or instructions to the example sink device 104. The low power indication indicates that the sink device 104 can enter a low power mode by turning off components and/or functionalities of the TCON 110 and/or driver 112 (e.g., some or all of the input/output (I/O), logic, one or more link(s) between the source device 102 and the sink device 104, etc.) and/or enter into a low power state. Additionally, the example source display controller 108 and/or other components of the source device 102 may turn off components and/or functionalities and/or may enter a low power state.

The example source display controller 108 transmits a wake up indication to the sink device 104 when frame data corresponding to a new and/or partial frame is generated by the GPU 106 and/or after a threshold amount of time has been reached (e.g., the threshold amount of time corresponding to the amount of time before a flicker, tear, lag, etc., will occur at the display 114 of the sink device 104 unless a new frame is obtained). After the wake up indication is sent, the example source display controller 108 sends the frame data stored in the frame buffer (e.g., new frame data and/or previous frame, if new frame data has not been received). The source display controller 108 is further described below in conjunction with FIG. 2.

The example TCON 110 of FIG. 1 receives frames and/or indications from the example source display controller 108 of the example source device 102. The example TCON 110 may receive the frame data at a high pixel clock frequency to obtain all the frame data quickly. The TCON 110 transmits a range of pixel clock frequencies that the sink device 104 is capable of operating at to the source device 102 when initially connected or at any other point in time. The TCON 110 transmits the frame data to the drivers 112 to display an image corresponding to the frame data on the display 114. As described above, the frame data includes information corresponding to how to control the pixels of the display 114 (e.g., an liquid crystal display (LCD)) to output a corresponding image (e.g., by adjusting light intensity, color, etc.). The example sink device 104 is capable of retaining the pixel values when running at a minimum refresh rate to hold the image on the display 114 until the TCON 110 obtains new frame data. However, if the new frame data is not obtained within a duration of time (e.g., maximum vblank), a flicker, studder, and/or lag may occur on the display 114.

The example sink sleep controller 111 of FIG. 1 obtains a low-power indication and/or wake-up indication from the source display controller 108. In response to obtaining a low-power indication, the sleep controller 111 sets a sleep-mode flag and the TCON 110 enters into a low power mode based on the flag. For example, the TCON 110 may turn off and/or enter a low power mode with respect to components of the TCON 110, I/Os of the TCON 110, and/or TCON logic. Additionally or alternatively, the example TCON 110 and/or the example sink sleep controller 111 may instruct the drivers 112 and/or any other component of the sink device 104 to turn off one or more components and/or enter into a low power mode. The example sink sleep controller 111 maintains a link between the source display controller 108 and the TCON 110 to determine if a wake up indication has been obtained. After a wake up indication is obtained, the sink sleep controller 111 sets the flag back to wake-up mode. In response to the wake-up mode flag, the example TCON 110 returns back to normal operating mode by exiting the low power mode and/or turning on any components and/or I/O that have been turned off. Additionally or alternatively, the example TCON 110 and/or the sink sleep controller 111 may instruct the example driver 112 and/or any other component of the sink device 104 to wake up by exiting low power mode and/or turning back on any components that were turned off during low power mode. Although the example sink sleep controller 111 is illustrated as a component of the TCON 110, the example sink sleep controller 111 may be located outside of the TCON 110 (e.g., coupled to the TCON 110). The example sink sleep controller 111 is further described below in conjunction with FIG. 2.

Figure 2:
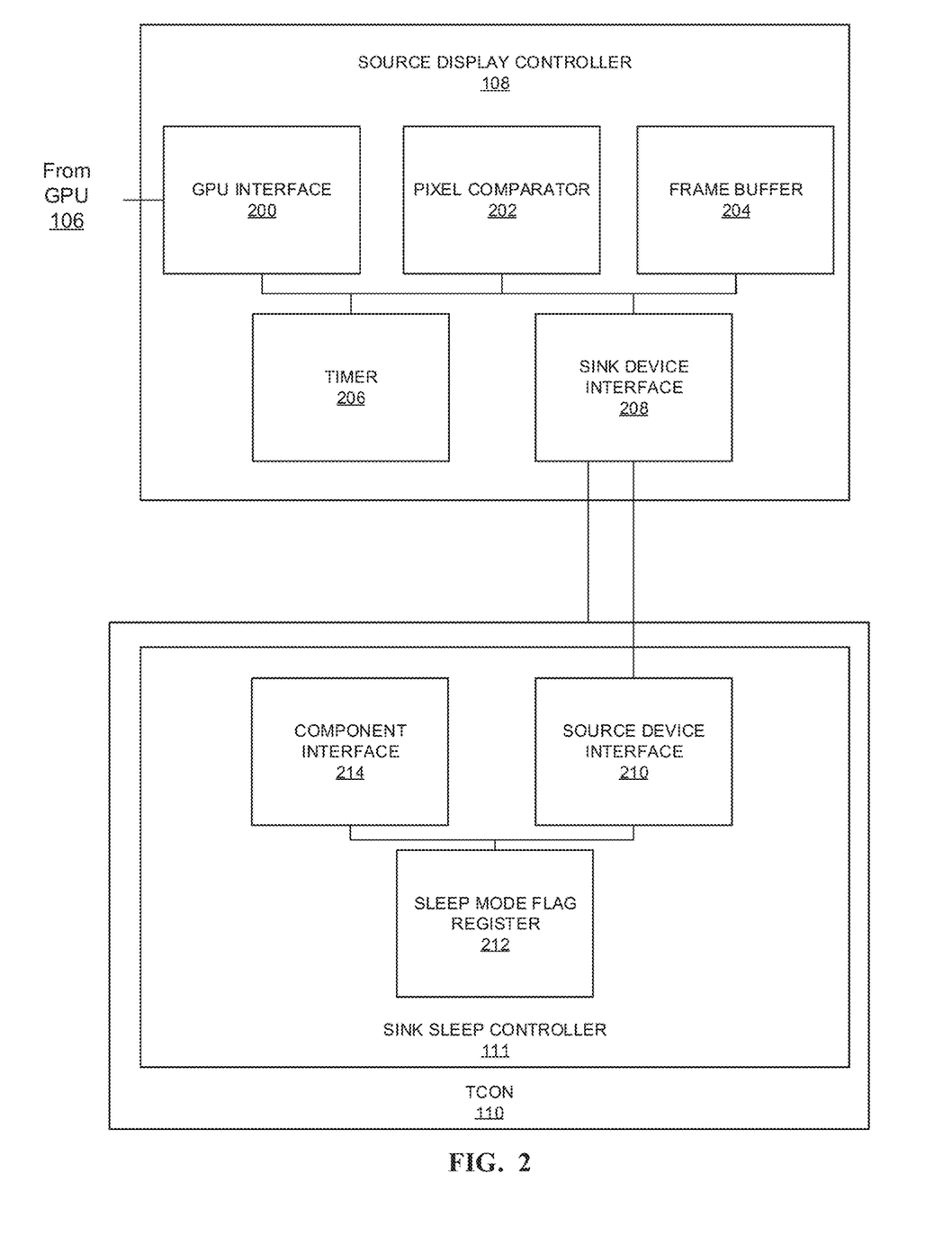
FIG. 2 is a block diagram of an example implementation of the dynamic source display controller and the example sink sleep controller of FIG. 1

FIG. 2 is block diagram of an example implementation of the source display controller 108 and the example sink sleep controller 111 of FIG. 1. The example source display controller 108 includes an example GPU interface 200, an example pixel comparator 202, an example frame buffer 204, an example timer 206, and an example sink device interface 208. The example sink sleep controller 111 includes an example source device interface 210, an example sleep mode flag resister 212, and an example component interface 214.

The example GPU interface 200 of FIG. 2 receives frame data from the example GPU 106. The GPU interface 200 passes the received frame data to the example pixel comparator 202. The example pixel comparator 202 determines that new frame data exists when the GPU interface 200 obtains the new frame data from the example GPU 106. The example pixel comparator 202 compares the pixel information in the newly obtained frame data to the current frame data stored in the example frame buffer 204. If there is no frame data stored in the example frame buffer 204, the example pixel comparator 202 stores the obtained frame data into the frame buffer 204 and instructs the example sink device interface 208 to transmit the frame data to the example sink device 104. If there is frame data in the frame buffer 204 (e.g. corresponding to previously frame data transmitted to the sink device 104), the example pixel comparator 202 determines if the updated frame data corresponds to a full or partial update. For example, if the pixel comparator 202 determines that less than a threshold number of pixels have changed from the obtained frame data to the stored frame data, the example pixel comparator 202 determines that the frame has been partially updated. If the pixel comparator 202 determines that more than the threshold number of pixels have changed from the obtained frame data to the stored frame data, the example pixel comparator 202 determines that the frame has been fully updated. The threshold may be based on user and/or manufacturer preferences. In some examples, the pixel comparator 202 may determine that an update is a partial update based on information in the frame data (e.g., if the frame data includes a partial update indicator or if the frame data only includes data for updated pixels). In such examples, the pixel comparator 202 will update the pixel information for the corresponding pixels in the frame data stored in the example frame buffer 204.

The example frame buffer 204 of FIG. 2 stores obtained frame data that is transmitted to the example sink device 104. When new frame data is obtained (e.g., corresponding to a full or partial update), the frame buffer 204 replaces the old frame data with the new frame data. If a partial update is received, the frame buffer 204 may only replace the partially updated frame data. The frame data remains in the frame buffer 204 so that the example sink device interface 208 can resend the stored frame data if the GPU 106 does not send subsequent frame data before a threshold amount of time to prevent flicker, lag, and/or studder at the display 114.

The example timer 206 of FIG. 2 tracks an amount of time since the sink device interface 208 has transmitted full frame data to the example sink device 104. As described above, the example display 114 can retain pixel values for a duration of time. However, if new frame data is not received at the sink device 104 within a threshold amount of time (e.g., vblank maximum), a flicker, a studder, and/or lag may occur at the example display 114. Accordingly, the example timer 206 sets (e.g., starts from zero) when the sink device interface 208 transmits full frame data to the sink device 104. The example timer 206 triggers an alert when one or more thresholds of time has passed. For example, the timer 206 transmits an alert to resend the frame data of the frame buffer 204 when a threshold amount of time has passed (e.g., vblank maximum, corresponding to the amount of time before a flicker, lag, studder, etc., may occur at the display 114). Additionally, the example timer 206 may transmit an alert to send the low power indication to the sink device 104 when a threshold amount of time has passed (e.g., vblank minimum, corresponding to the highest refresh rate the sink device 104 can support). In this manner, the source display controller 108 ensures that all of the frame data was received by the example sink device 104 and the low power indication can be sent without affecting performance of the sink device 104. The example timer 206 resets (e.g., restarts from zero) when new full frame data has been transmitted to the sink device 104. As described above, a partial update may cause the example drivers 112 to only update the corresponding pixels in the display 114. Accordingly, the timer 206 will not reset for a partial update because a flicker can still occur on the display 114 for the non-updated pixels from a partial update. The example thresholds (e.g., vblank minimum and/or vblank maximum) may be based on the capabilities of the sink device 104. Although the example source display controller 108 includes the example timer 206, the source display controller 108 may include a counter that increments based on clock cycles and/or another time measurement.

The example sink device interface 208 of FIG. 2 transmits frame data and/or partial frame data to the example sink device 104. Additionally, the example sink device interface 208 may receive information corresponding to the capabilities of the panel (e.g., refresh rate(s), pixel clock frequency range, pixel retention capabilities, resolution capabilities, vertical blanking duration, etc.) when initially connected, when a change occurs (e.g., the display changes resolution), and/or at any time. After the example timer 206 outputs an alert corresponding to a threshold amount of time occurring (e.g., the vblank minimum), the example sink device interface 208 transmits a low power indication to the example sink device 104. After the example timer 206 outputs an alert corresponding to a second threshold amount of time occurring (e.g., the vblank maximum) and/or after a new full frame is received from the example GPU 106, the example sink device interface 208 transmits a wake up indication to the example sink device 104. In some examples, the sink device interface 208 transmits frame data over a first link(s) (e.g., a main link(s), an eDP link(s), etc.) and transmits the indication over a second link. In this manner, the example sink device 104 can shut down the first link(s) during low power mode and monitor the second link to determine when to wake up. Although the example sink device interface 208 is represented as a single interface, the example sink device interface 208 may be two or more interfaces (e.g., a first interface to transmit the frame data and a second interface to transmit the indication(s)).

The example source device interface 210 of FIG. 2 monitors a channel (e.g., link, connection, etc.) to be able to identify wake-up indications and/or low-power indications from the example source display controller 108. As described above, during low-power mode, a link will remain active so that the example source display controller 108 can determine when a wake-up indication is received during low-power mode. When a wake-up indication and/or low-power indication is sensed (e.g., obtained), the source device interface 210 sets the corresponding flag of the example sleep mode flag register 212. For example, when a wake-up mode indication is obtained, the example source device interface 210 sets the wake-up mode flag in the example sleep mode flag register 212 (e.g., by setting the value to a first binary value) and when a low-power mode indication is obtained, the source device interface removes the wake-up flag from the example sleep mode flag register 212 (e.g., by setting the value to a second binary value different than the first binary value). The example sleep mode flag register 212 may be a single register (e.g., whose stored value indicates low-power mode or wake-up mode) or may be multiple registers (e.g., a first register for low-power mode and a second register for wake-up mode).

The example component interface 214 of FIG. 2 sends instructions to the components of the example TCON 110 and/or other components of the sink device 104 (e.g., the drivers 112, the display 114, etc., directly or via the TCON 110) to enter a low-power mode when the sleep mode flag register 212 is set to a value corresponding to low-power mode. Additionally, the example component interface 214 of FIG. 2 sends instructions to the components of the example TCON 110 and/or other components of the sink device 104 (e.g., the drivers 112, the display 114, etc., directly or via the TCON 110) to wake up from low-power mode when the sleep mode flag register 212 is set to a value corresponding to wake-up mode.

While an example manner of implementing the example source display controller 108 of FIG. 1 is illustrated in FIG. 2, one or more of the elements, processes and/or devices illustrated in FIG. 2 may be combined, divided, re-arranged, omitted, eliminated and/or implemented in any other way. Further, the example GPU interface 200, the example pixel comparator 202, the example frame buffer 203, the example timer 206, the example sink device interface 208, the example source device interface 210, the example sleep mode flag resister 212, the example component interface 214, and/or, more generally, the example source display controller 108 and/or the example sink sleep controller 111 of FIG. 2 may be implemented by hardware, software, firmware and/or any combination of hardware, software and/or firmware. Thus, for example, any of the example GPU interface 200, the example pixel comparator 202, the example frame buffer 203, the example timer 206, the example sink device interface 208, the example source device interface 210, the example sleep mode flag resister 212, the example component interface 214, and/or, more generally, the example source display controller 108 and/or the example sink sleep controller 111 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s))). When reading any of the apparatus or system claims of this patent to cover a purely software and/or firmware implementation, at least one of the example GPU interface 200, the example pixel comparator 202, the example frame buffer 203, the example timer 206, the example sink device interface 208, the example source device interface 210, the example sleep mode flag resister 212, the example component interface 214, and/or, more generally, the example source display controller 108 and/or the example sink sleep controller 111 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, example source display controller 108 and/or the example sink sleep controller 111 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
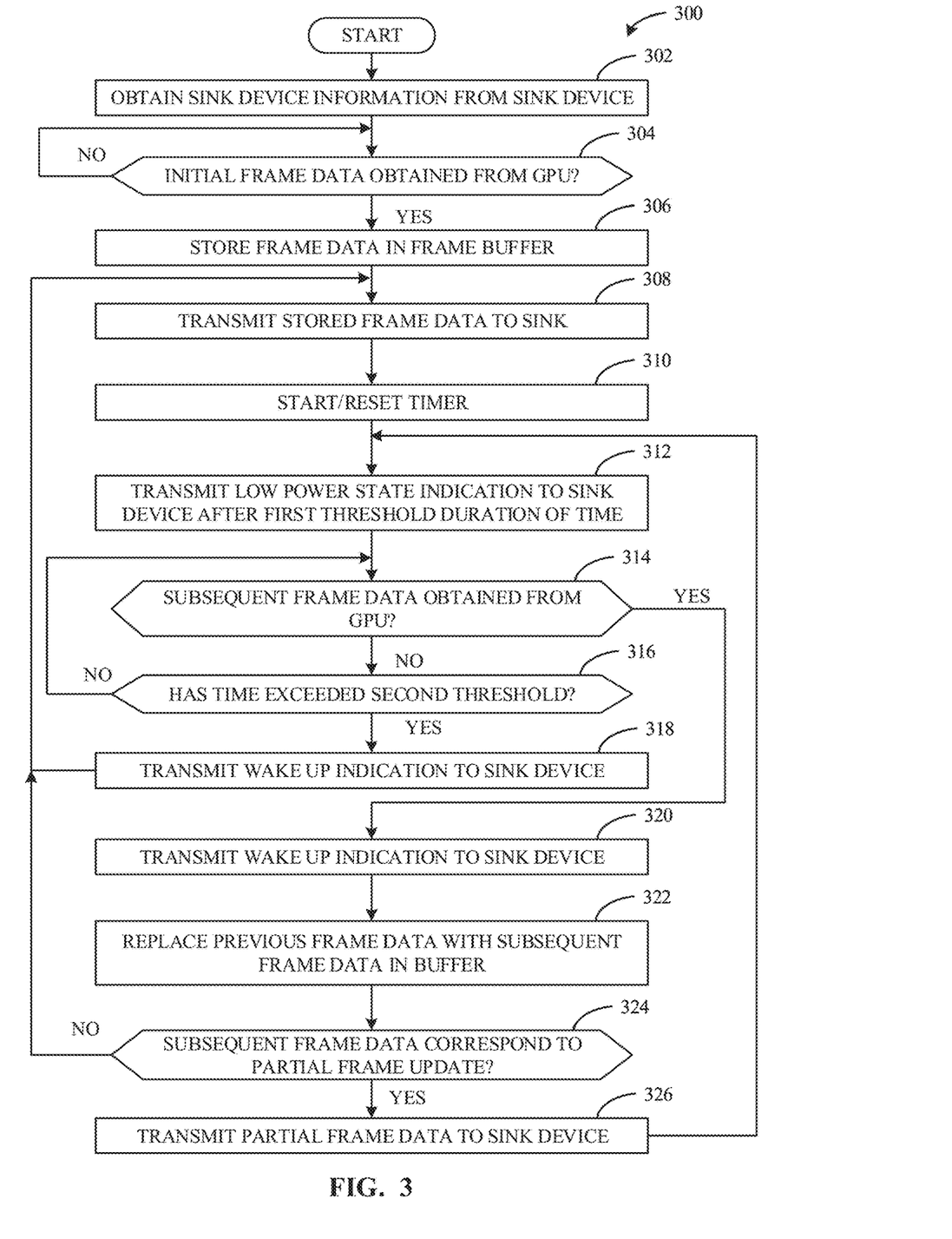
FIG. 3 is a flowchart representative of example machine readable instructions which may be executed to implement the example source display controller of FIGS. 1 and/or 2 to improve power consumption and improve battery life.

Flowcharts representative of example hardware logic, machine readable instructions, hardware implemented state machines, and/or any combination thereof for implementing the example source display controller 108 and/or the example sink sleep controller 111 of FIGS. 1 and/or 2 are shown in FIGS. 3 and/or 4. The machine readable instructions may be one or more executable programs or portion(s) of an executable program for execution by a computer processor such as the processor 612, 712 shown in the example processor platform 600, 700 discussed below in connection with FIGS. 6 and/or 7. The program may be embodied in software stored on a non-transitory computer readable storage medium such as a CD-ROM, a floppy disk, a hard drive, a DVD, a Blu-ray disk, or a memory associated with the processor 612, 712, but the entire program and/or parts thereof could alternatively be executed by a device other than the processor 612, 712 and/or embodied in firmware or dedicated hardware. Further, although the example program is described with reference to the flowcharts illustrated in FIGS. 3 and/or 4 many other methods of implementing the example source display controller 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is an example flowchart representative of machine readable instructions 300 that may be executed to implement the example source display controller 108 of FIG. 2 to save power and/or extend battery life of the example display system 100 of FIG. 1. Although the instructions 300 are described in conjunction with the example display system 100 of FIG. 1 and the example source display controller 108 of FIG. 2, the instructions 300 may be described in conjunction with any type of source display controller in any type of display system.

At block 302, the example sink device interface 208 obtains information from the example sink device 104. For example, the example sink device 104 may transmit sink capabilities (e.g., refresh rate(s), pixel clock frequency range, pixel retention capabilities, resolution capabilities, vertical blanking duration, etc.) to the example sink device interface 208. The example source display controller 108 can use the sink capabilities to set the refresh rate(s), pixel clock frequency(ies), and/or threshold(s) of time (e.g., vblank maximum and/or vblank minimum).

At block 304, the example pixel comparator 202 of FIG. 2 determines if an initial frame has been obtained from the example GPU 106 via the example GPU interface 200. If the example pixel comparator 202 determines that an initial frame has not been obtained from the example GPU 106 via the example GPU interface 200 (block 304: NO), control returns to block 304 until an initial frame is obtained. If the example pixel comparator 202 determines that an initial frame has been obtained from the example GPU 106 via the example GPU interface 200 (block 304: YES), the example frame buffer 204 stores the frame data (block 306).

At block 308, the example sink device interface 208 transmits the frame data to the sink device 104. In some examples, the sink device interface 208 may use a main link and/or eDP link to transmit the frame data. The example sink device interface 208 may transmit the frame data at a high pixel clock frequency (e.g., pixel clock frequency above a threshold and/or a highest pixel clock frequency based on the capabilities of the example sink device 104). At block 310, the example timer 206 starts a vertical blanking timer (e.g., for subsequent frames the timer 206 resets and/or restarts the vertical blanking timer). At block 312, the example sink device interface 208 transmits a low power state indication to the example sink device 104 after a first threshold duration of time (e.g., the vblank minimum). The example timer 206 outputs an alert when the time exceeds the first threshold duration of time to trigger the output of the low power state indication. The first duration of time corresponds to the highest refresh rate that the example sink device 104 can support (e.g., to ensure that the sink device 104 receives all the frame data prior to the sink device interface 208 sending the low power state indication).

At block 314, the example pixel comparator 202 determines if subsequent frame data was obtained from the example GPU 106 via the example GPU interface 200. If the example pixel comparator 202 determines that subsequent data has been obtained from the example GPU 106 (block 314: YES), control continues to block 320, as further described below. If the example pixel comparator 202 determines that subsequent data has not been obtained from the example GPU 106 (block 314: NO), the example timer 206 determines if the time has exceeded a second threshold (e.g., the vblank maximum) (block 316). The threshold corresponds to the amount of time that the display 114 can display an image without a new frame before a flicker, studder, and/or lag may occur. If the example timer 206 determines that the time has not exceeded the second threshold (block 316: NO), control returns to block 314 until a subsequent frame is received or the threshold time is exceeded. If the example timer 206 determines that the time has exceeded the second threshold (block 316: YES), the example sink device interface 208 transmits a wake up indication to the example sink device 104 (block 318) and control returns to block 308 to retransmit the frame data stored in the example frame buffer 204. If the example pixel comparator 202 determines that subsequent data has been obtained from the example GPU 106 (block 314: YES), the example sink device interface 208 transmits a wake up indication to the example sink device 104 (block 320).

At block 322, the example frame buffer 204 replaces the previous frame data with the subsequent frame data. At block 324, the example pixel comparator 202 determines if the subsequent frame corresponds to a partial frame update. As described above in conjunction with FIG. 2, the pixel comparator 202 may determine whether the subsequent frame corresponds to a partial frame update by comparing the subsequent frame data to the frame data stored in the example frame buffer 204 (e.g., frame data previously sent to the sink device 104). For example, the pixel comparator 202 may determine the subsequent frame is a partial frame update when less than a threshold number of pixels have been updated from the previous frame data. In some examples, the pixel comparator 202 may determine whether the subsequent frame corresponds to a partial frame update based on the frame data itself, as described above in conjunction with FIG. 2.

If the example pixel comparator 202 determines that the subsequent frame data does not correspond to a partial frame update (block 324: NO), control returns to block 308 to transmit the subsequent frame data to the sink device 104 and restart the example timer 206. If the example pixel comparator 202 determines that the subsequent frame data corresponds to a partial frame update (block 324: YES), the example sink device interface 208 transmits the partial frame data to the sink device 104 (block 326) and control returns to block 312 (and the timer 206 is not reset).

Figure 4:
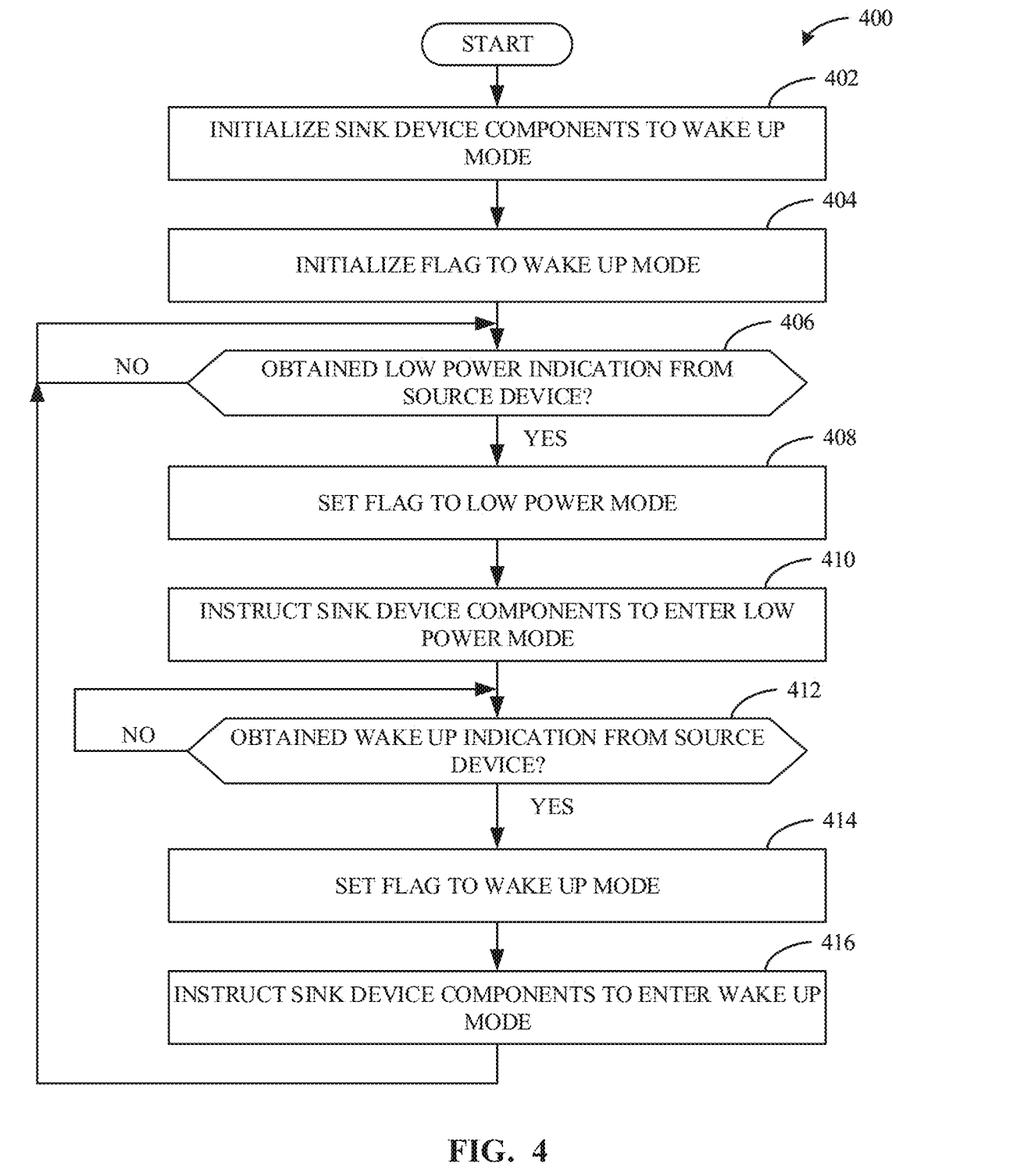
FIG. 4 is a flowchart representative of example machine readable instructions which may be executed to implement the example sink sleep controller of FIGS. 1 and/or 2 to improve power consumption and improve battery life.

FIG. 4 is an example flowchart representative of machine readable instructions 400 that may be executed to implement the example sink sleep controller 111 of FIG. 2 to save power and/or extend battery life of the example display system 100 of FIG. 1. Although the instructions 400 are described in conjunction with the example display system 100 of FIG. 1 and the example sink sleep controller 111 of FIG. 2, the instructions 300 may be described in conjunction with any type of sink sleep controller in any type of display system.

At block 402, the example component interface 214 initializes the components of the sink device 104 to wake-up mode. For example, the component interface 214 may transmit instructions (e.g., directly or indirectly) to the TCON 110, the driver 112, the display 114, and/or any other components of the sink device 104 so that the components are not operating in low-power mode. At block 404, the example source device interface 210 initializes the flag of the example sleep-mode flag register 212 to correspond to a wake-up mode.

At block 406, the example source device interface 210 determines if a low-power indication has been obtained from the example source device 102. If the example source device interface 210 determines that a low-power indication was not received from the source device 102 (block 406: NO), control returns to block 406 until a low-power indication is received. If the example source device interface 210 determines that a low-power indication was received from the source device 102 (block 406: YES), the example source device interface 210 sets a flag of the sleep mode flag register 212 to low-power mode (block 408), as described above in conjunction with FIG. 2. At block 410, the example component interface 214 instructs the components of the sink device 104 to enter a low-power mode. For example, the component interface 214 may instruct the TCON 110 to turn off, or enter low power mode with, I/Os and/or other components and/or may instruct the drivers 112 to power down and/or enter a low-power mode.

At block 412, the example source device interface 210 determines if a wake-up indication has been obtained from the example source device 102. If the example source device interface 210 determines that a wake-up indication was not received from the source device 102 (block 412: NO), control returns to block 406 until a wake-up indication is received. If the example source device interface 210 determines that a wake-up indication was received from the source device 102 (block 412: YES), the example source device interface 210 sets a flag of the sleep mode flag register 212 to wake-up mode (block 414), as described above in conjunction with FIG. 2. At block 416, the example component interface 214 instructs the components of the sink device 104 to enter a wake-up mode. For example, the component interface 214 may instruct the TCON 110 to turn back on, or enter full power mode with, I/Os and/or other components and/or may instruct the drivers 112 to turn back on and/or return from the low-power mode.

Figure 5:
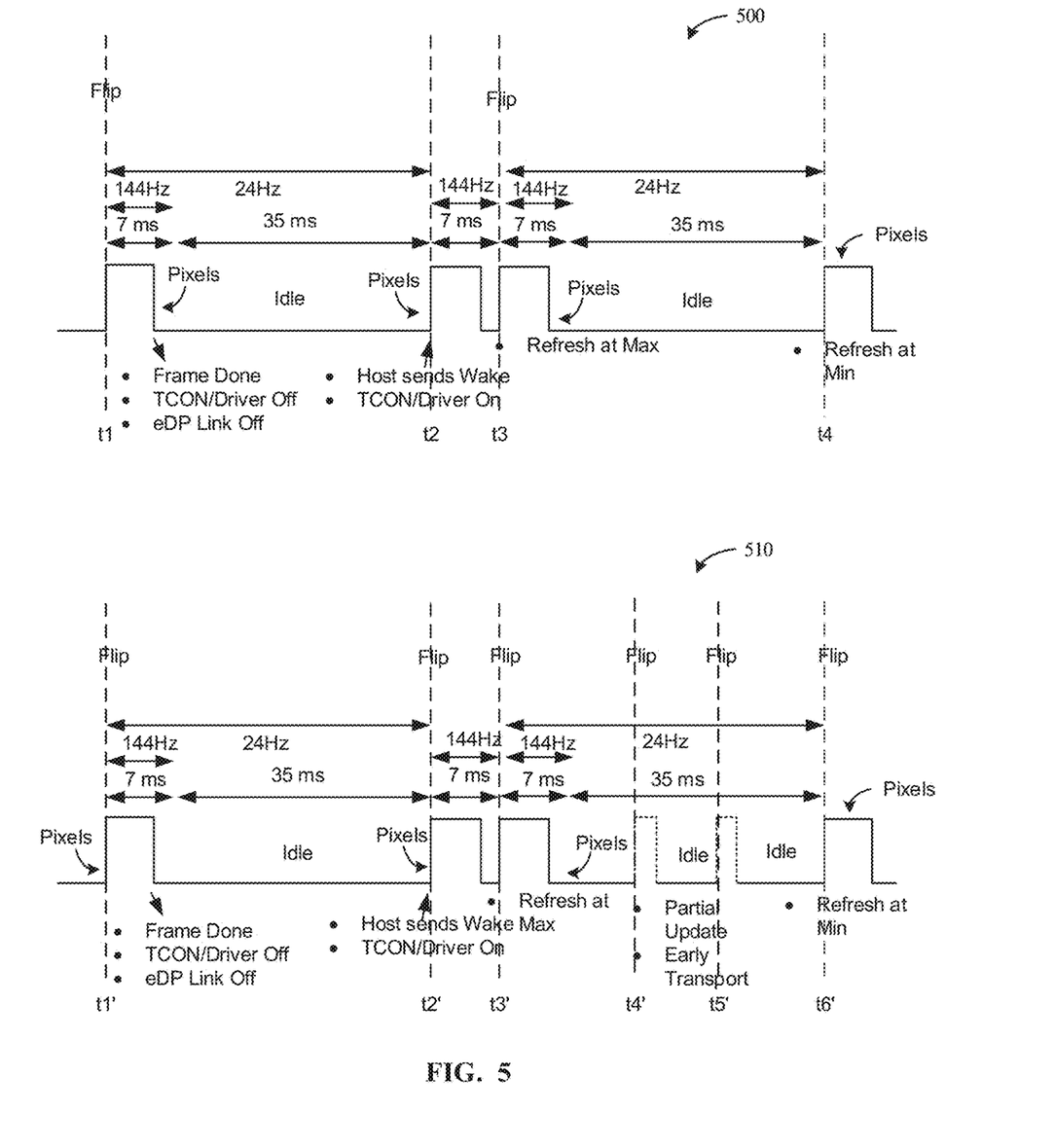
FIG. 5 illustrates two timing diagrams in accordance with the examples disclosed herein.

FIG. 5 illustrates a first example timing diagram 500 and a second example timing diagram 510 in conjunction with examples disclosed herein. The first and second example timing diagrams 500, 510 illustrate two examples of how frame data may be transmitted from the source device 102 to the sink device 104. Although the example timing diagrams 500, 510 illustrates two particular examples, the source device 102 may transmit timing data at different times, for different durations, and/or at different rates. In the example of FIG. 5, the minimum refresh rate of the sink device 104 is 24 Hz and the maximum refresh rate of the sink device 104 is 144 Hz. Alternatively, the refresh rates may be any refresh rates.

At time t1 of the example timing diagram 500, the GPU 106 outputs new frame data (e.g., identifying in FIG. 5 as a "Flip"). When a flip occurs, the example source device 102 transmits the frame data (e.g., pixel data) to the example sink device 104 at a rate of 144 Hz for 7 milliseconds (e.g., the sum of the vblank minimum threshold duration (e.g., 0.35 milliseconds or about 5% of 7 milliseconds) and an active time (which is set at the pixel clock of highest refresh rate) (e.g., 6.65 milliseconds)). Because the sink device 104 can retain the pixels without decaying until 24 Hz, the sink device 104 can be power managed after the pixels are updated until they need to be updated again. Accordingly, even though the sink device 104 is receiving pixels at the 144 HZ rate, the display 114 is effectively running at 24 Hz. Although the sum of the blank minimum duration and the active time is illustrated in FIG. 5 as 7 milliseconds (ms), the sum may be any amount of time (e.g., based on the characteristics of the sink device 104). After the 7 millisecond duration, the example source device 102 transmits a low power indication to the example sink device 104. In this manner, the sink device 104 can power down (e.g., or enter low power mode) one or more components of the TCON 110 and/or drivers 112 until (A) the next flip or (B) the vblank maximum duration expires.

At time t2, the sum of a vblank maximum duration and the active time (e.g., 42 milliseconds in the illustrated example of FIG. 5) expires. Although the sum of the vblank maximum duration and the active time is illustrated in FIG. 5 as 42 ms, the vblank duration may be any amount of time based on the characteristics of the sink device 104. Because the sum of the vblank maximum duration and the active time has occurred, the example source device 102 transmits a wake up indication to the sink device 104 and retransmits the same frame data sent at time t1 to the sink device 104 and the timer 206 is reset. At time t3, prior to the sum of the vblank minimum and the active time exceeding, a flip occurs at the source device 102 and the source device 102 transmits the updated frame data corresponding to the flip to the sink device 104, and the process is repeated.

The example timing diagram 510 of FIG. 5 illustrates partial frame updates at time t4' and t5.' As described above, a partial frame update occurs when a flip corresponds to less than a threshold number of pixels being updated from a previous frame. At times t4' and t5', the example source device 102 transmits the wake up indication to the sink device 104 and transmits the partial frame update data to the example sink device 104. The example timer 206 is not reset (e.g., continues to run until the sum of the vblank maximum duration and the active time has occurred) in response to the partial frame update flips at times t4' and t5'. After the source device 102 transmits the partial frame data to the sink device 104, the source device 102 transmits a low power indication to the sink device 104 so that the sink device 104 can enter a low power mode and/or turn off components of the example TCON 110, the example drivers 112, etc.

Figure 6:
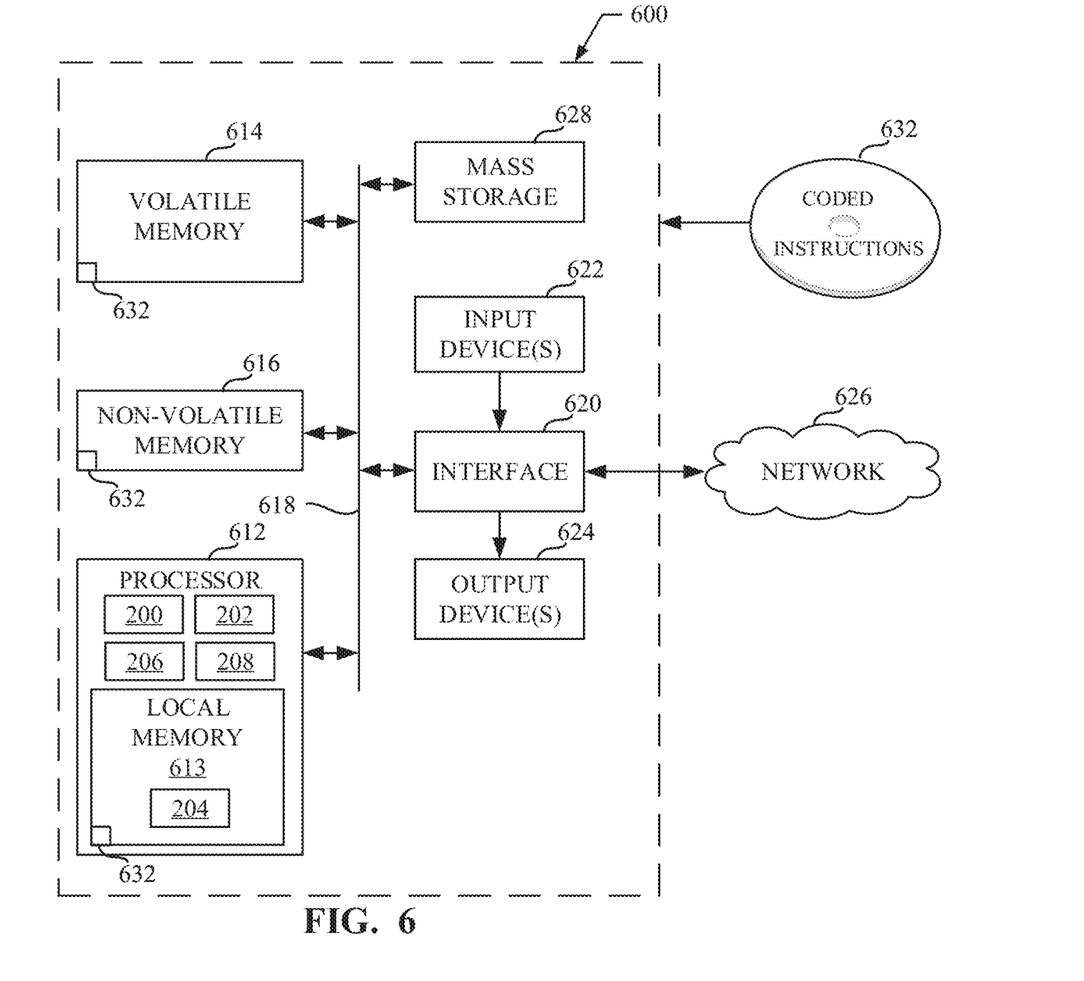
FIG. 6 is a block diagram of an example processing platform structured to execute the instructions of FIG. 3 to implement the example source display controller of FIGS. 1 and/or 2.

FIG. 6 is a block diagram of an example processor platform 600 structured to execute the instructions of FIG. 3 to implement the source display controller 108 of FIG. 2. The processor platform 600 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example GPU interface 200, the example pixel comparator 202, the example timer 206, and the example sink device interface 208 of FIG. 2.

The processor 612 of the illustrated example includes a local memory 613 (e.g., a cache). In this example, the memory 613 implements the example frame buffer 204. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 3 may be stored in the mass storage device 628, in the volatile memory 614, in the non-volatile memory 616, and/or on a removable non-transitory computer readable storage medium such as a CD or DVD.

Figure 7:
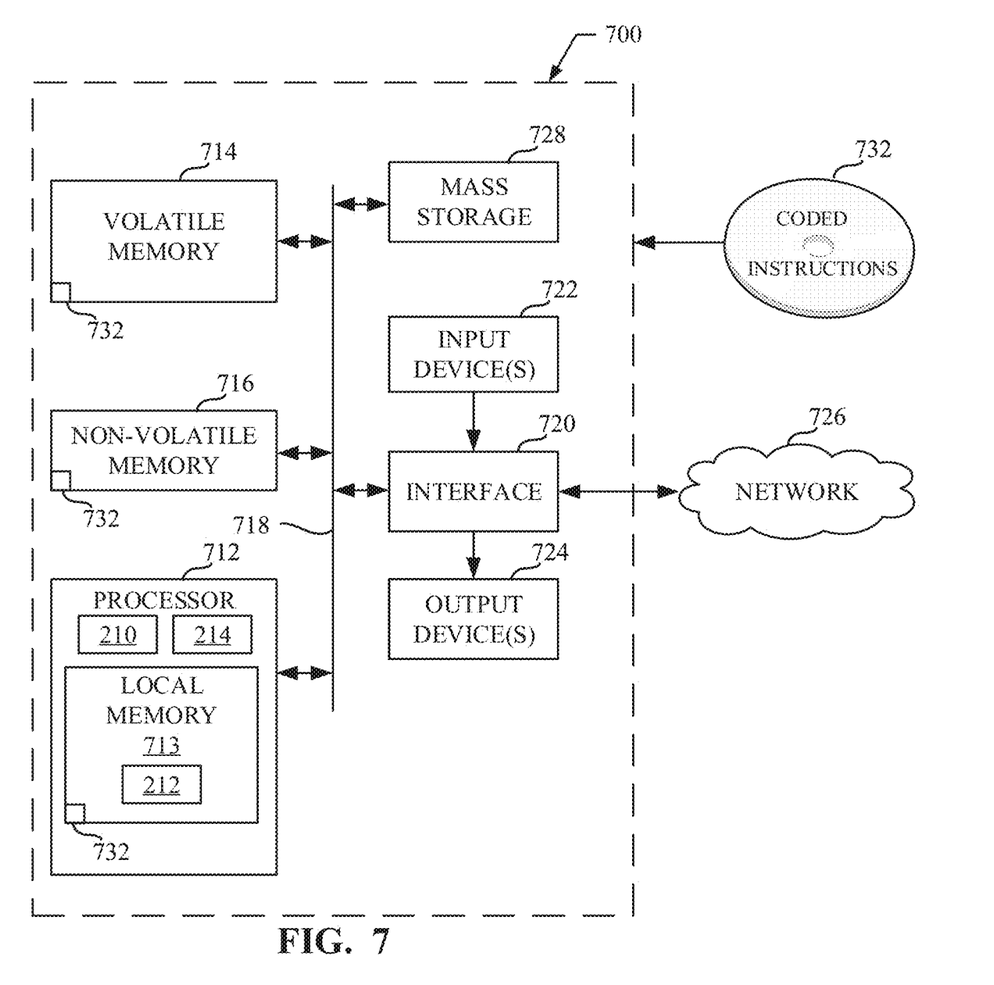
FIG. 7 is a block diagram of an example processing platform structured to execute the instructions of FIG. 4 to implement the example sink sleep controller of FIGS. 1 and/or 2.

FIG. 7 is a block diagram of an example processor platform 700 structured to execute the instructions of FIG. 4 to implement the source display controller 108 of FIG. 2. The processor platform 700 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example source device interface 200 and the example component interface 214.

The processor 712 of the illustrated example includes a local memory 713 (e.g., a cache). In this example, the local memory 713 implements the example sleep mode flag register 212. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 4 may be stored in the mass storage device 728, in the volatile memory 714, in the non-volatile memory 716, and/or on a removable non-transitory computer readable storage medium such as a CD or DVD.

Example methods, apparatus, systems, and articles of manufacture to reduce power consumption and improve battery life of display systems using adaptive sync are disclosed herein. Further examples and combinations thereof include the following: Example 1 includes an apparatus comprising an interface to transmit frame data to a sink device, the frame data generated by a processor, a timer to initiate in response to the transmission of the frame data to the sink device, and the interface to transmit a low power indication to the sink device after the timer reaches a threshold amount of time.

Example 2 includes the apparatus of example 1, wherein the interface is a first interface, further including a second interface to obtain the frame data from the processor.

Example 3 includes the apparatus of example 2, wherein the threshold amount of time is a first threshold amount of time, the first interface to, in response to at least one of (A) the timer reaching a second threshold amount of time or (B) the second interface obtaining subsequent frame data from the processor, transmit a wake up indication to the sink device.

Example 4 includes the apparatus of example 3, wherein the timer is to reset in response to the at least one of (A) the timer reaching the second threshold amount of time or (B) the second interface obtaining the subsequent frame data from the processor.

Example 5 includes the apparatus of example 2, wherein the second interface is to obtain subsequent frame data from the processor, and the first interface is to transmit a wake up indication to the sink device, and transmit the subsequent frame data to the sink device after the wake up indication.

Example 6 includes the apparatus of example 2, wherein the second interface is to obtain subsequent frame data from the processor, further including a comparator to compare the frame data to the subsequent frame data to determine if the subsequent frame data corresponds to a full update or a partial update, the partial update corresponding to less than a threshold number of pixels updated from the frame data and the subsequent frame data.

Example 7 includes the apparatus of example 6, wherein the timer is to (A) reset in response to the full update and (B) not reset in response to the partial update.

Example 8 includes the apparatus of example 1, wherein the threshold amount of time is a first threshold amount of time, the interface to transmit a wake up indication to the sink device in response to the timer reaching a second threshold amount of time, and in response to the transmitting the wake up indication, retransmit the frame data to the sink device.

Example 9 includes the apparatus of example 1, wherein the low power indication causes the sink device to turn off a component.

Example 10 includes a non-transitory computer readable storage medium comprising instructions which, when executed, cause one or more processors to at least transmit frame data to a sink device, the frame data generated by a processor, initiate a timer in response to the transmission of the frame data to the sink device, and transmit a low power indication to the sink device after the timer reaches a threshold amount of time.

Example 11 includes the computer readable storage medium of example 10, wherein the instructions cause the one or more processors to obtain the frame data from the processor.

Example 12 includes the computer readable storage medium of example 11, wherein the threshold amount of time is a first threshold amount of time, the instructions to cause the one or more processors to, in response to at least one of (A) the timer reaching a second threshold amount of time or (B) obtaining subsequent frame data from the processor, transmit a wake up indication to the sink device.

Example 13 includes the computer readable storage medium of example 12, wherein the instructions cause the one or more processors to reset the timer in response to the at least one of (A) the timer reaching the second threshold amount of time or (B) obtaining the subsequent frame data from the processor.

Example 14 includes the computer readable storage medium of example 11, wherein the instructions cause the one or more processors to obtain subsequent frame data from the processor, transmit a wake up indication to the sink device, and transmit the subsequent frame data to the sink device after the wake up indication.

Example 15 includes the computer readable storage medium of example 11, wherein the instructions cause the one or more processors to obtain subsequent frame data from the processor, and compare the frame data to the subsequent frame data to determine if the subsequent frame data corresponds to a full update or a partial update, the partial update corresponding to less than a threshold number of pixels updated from the frame data and the subsequent frame data.

Example 16 includes the computer readable storage medium of example 15, wherein the instructions cause the one or more processors to (A) reset the timer in response to the full update and (B) not reset the timer in response to the partial update.

Example 17 includes the computer readable storage medium of example 10, wherein the threshold amount of time is a first threshold amount of time, the instructions to cause the one or more processors to transmit a wake up indication to the sink device in response to the timer reaching a second threshold amount of time, and in response to the transmitting the wake up indication, retransmit the frame data to the sink device.

Example 18 includes the computer readable storage medium of example 10, wherein the low power indication causes the sink device to turn off a component.

Example 19 includes a method comprising transmitting frame data to a sink device, the frame data generated by a processor, initiating a timer in response to the transmission of the frame data to the sink device, and transmitting a low power indication to the sink device after the timer reaches a threshold amount of time.

Example 20 includes the method of example 19, further including obtaining the frame data from the processor.

From the foregoing, it will be appreciated that example methods, apparatus and articles of manufacture have been disclosed to reduce power consumption and improve battery life of display systems using adaptive sync. Example methods, apparatus and articles of manufacture improve power consumption and improve battery life by transmitting a low power indication to a panel after frame data has been sent to the panel. In this manner, the panel can turn off components and/or enter into a low power mode in response to receiving the low power indication. For example, source devices can save between 120-400 milliwatts (mW) of power using examples disclosed herein. Accordingly, example methods, apparatus and articles of manufacture disclosed herein are directed to one or more improvement(s) in the functioning of a display system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an interface to transmit frame data to a sink device, the frame data generated by a processor;
   a timer to initiate in response to the transmission of the frame data to the sink device;
   the interface to transmit a low power indication to the sink device after the timer reaches a threshold amount of time; and
   a comparator to compare the frame data to subsequent frame data to determine if the subsequent frame data corresponds to a full update or a partial update, the partial update corresponding to less than a threshold number of pixels updated from the frame data and the subsequent frame data, the timer to (A) reset in response to the full update and (B) not reset in response to the partial update.

2. The apparatus of claim 1, wherein the interface is a first interface, further including a second interface to obtain the frame data from the processor.

3. The apparatus of claim 2, wherein the threshold amount of time is a first threshold amount of time, the first interface to, in response to at least one of (A) the timer reaching a second threshold amount of time or (B) the second interface obtaining the subsequent frame data from the processor, transmit a wake up indication to the sink device.

4. The apparatus of claim 3, wherein the timer is to reset in response to the at least one of (A) the timer reaching the second threshold amount of time or (B) the second interface obtaining the subsequent frame data from the processor.

5. The apparatus of claim 2, wherein:
the second interface is to obtain the subsequent frame data from the processor; and
the first interface is to:
transmit a wake up indication to the sink device; and
transmit the subsequent frame data to the sink device after the wake up indication.

6. The apparatus of claim 2, wherein the second interface is to obtain the subsequent frame data from the processor.

7. The apparatus of claim 1, wherein the threshold amount of time is a first threshold amount of time, the interface to:
transmit a wake up indication to the sink device in response to the timer reaching a second threshold amount of time; and
in response to transmitting the wake up indication, retransmit the frame data to the sink device.

8. The apparatus of claim 1, wherein the low power indication causes the sink device to turn off a component.

9. A non-transitory computer readable medium comprising instructions which, when executed, cause one or more processors to at least:
transmit frame data to a sink device, the frame data generated by a processor;
initiate a timer in response to the transmission of the frame data to the sink device;
transmit a low power indication to the sink device after the timer reaches a threshold amount of time;
compare the frame data to first subsequent frame data to determine that the first subsequent frame data corresponds to a full update;
compare the frame data to second subsequent frame data to determine that the second subsequent frame data corresponds to a partial update, the partial update corresponding to less than a threshold number of pixels updated from the frame data and the second subsequent frame data; and
reset the timer in response to the full update and not reset the timer in response to the partial update.

10. The computer readable medium of claim 9, wherein the instructions cause the one or more processors to obtain the frame data from the processor.

11. The computer readable medium of claim 10, wherein the threshold amount of time is a first threshold amount of time, the instructions to cause the one or more processors to, in response to at least one of (A) the timer reaching a second threshold amount of time or (B) obtaining the first subsequent frame data from the processor, transmit a wake up indication to the sink device.

12. The computer readable medium of claim 11, wherein the instructions cause the one or more processors to reset the timer in response to the at least one of (A) the timer reaching the second threshold amount of time or (B) obtaining the first subsequent frame data from the processor.

13. The computer readable medium of claim 10, wherein the instructions cause the one or more processors to:
obtain the first subsequent frame data from the processor;
transmit a wake up indication to the sink device; and
transmit the first subsequent frame data to the sink device after the wake up indication.

14. The computer readable medium of claim 10, wherein the instructions cause the one or more processors to obtain the first subsequent frame data from the processor.

15. The computer readable medium of claim 9, wherein the threshold amount of time is a first threshold amount of time, the instructions to cause the one or more processors to:
transmit a wake up indication to the sink device in response to the timer reaching a second threshold amount of time; and
in response to transmitting the wake up indication, retransmit the frame data to the sink device.

16. The computer readable medium of claim 9, wherein the low power indication causes the sink device to turn off a component.

17. A method comprising:
transmitting frame data to a sink device, the frame data generated by a processor;
initiating, by executing an instruction with one or more processors, a timer in response to the transmission of the frame data to the sink device;
transmitting a low power indication to the sink device after the timer reaches a threshold amount of time;
comparing the frame data to subsequent frame data to determine if the subsequent frame data corresponds to a full update or a partial update, the partial update corresponding to less than a threshold number of pixels updated from the frame data and the subsequent frame data;
in response to determining that the subsequent frame data corresponds to a full update, resetting the timer in response to the full update; and
in response to determining that the subsequent frame data corresponds to a partial update, continuing the timer.

18. The method of claim 17, further including obtaining the frame data from the processor.

19. An apparatus comprising:
memory;
instructions in the apparatus; and
processor circuitry to execute the instruction to:
transmit frame data to a sink device, the frame data generated by a processor;
initiate a timer in response to the transmission of the frame data to the sink device;
transmit a low power indication to the sink device after the timer reaches a threshold amount of time;
compare the frame data to subsequent frame data to determine if the subsequent frame data corresponds to a full update or a partial update, the partial update corresponding to less than a threshold number of pixels updated from the frame data and the subsequent frame data;
reset the timer based on the subsequent frame data corresponding to the full update; and
maintain the timer based on the subsequent frame data corresponding to the partial update.

20. The apparatus of claim 19, wherein the processor circuitry is to obtain the frame data from the processor.

21. The apparatus of claim 20, wherein the threshold amount of time is a first threshold amount of time, the processor circuitry to, in response to at least one of (A) the timer reaching a second threshold amount of time or (B) obtaining the subsequent frame data from the processor, transmit a wake up indication to the sink device.

22. The apparatus of claim 21, wherein the processor circuitry is to reset the timer in response to the at least one of (A) the timer reaching the second threshold amount of time or (B) obtaining the subsequent frame data from the processor.

23. The apparatus of claim 20, wherein the processor circuitry is to:
- obtain the subsequent frame data from the processor;
- transmit a wake up indication to the sink device; and
- transmit the subsequent frame data to the sink device after the wake up indication.

24. The apparatus of claim 19, wherein the threshold amount of time is a first threshold amount of time, the processor circuitry to:
- transmit a wake up indication to the sink device in response to the timer reaching a second threshold amount of time; and
- in response to transmitting the wake up indication, retransmit the frame data to the sink device.

25. The apparatus of claim 19, wherein the low power indication causes the sink device to turn off a component.

* * * * *